March 29, 1938. S. NIXON 2,112,425
SPRING EXPANDER FOR PISTON RINGS
Filed May 17, 1937
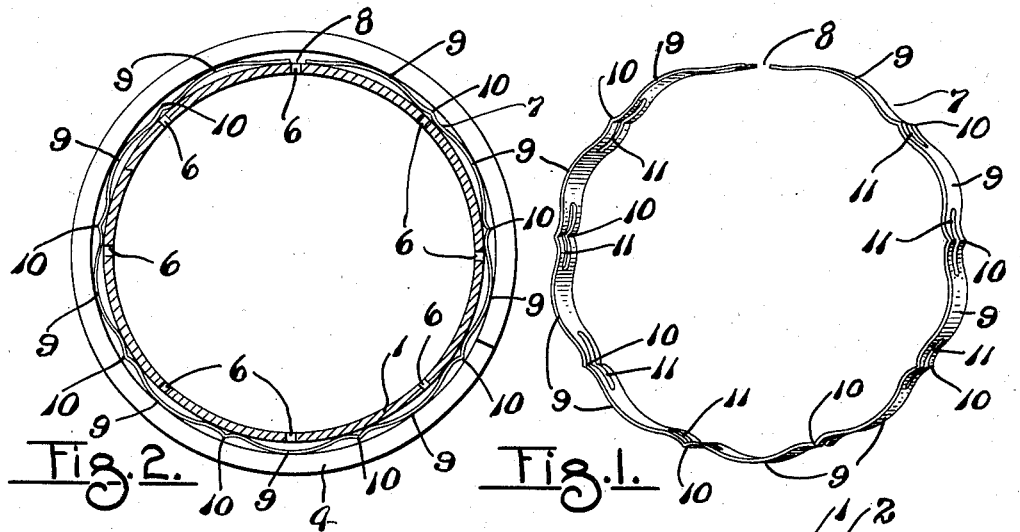
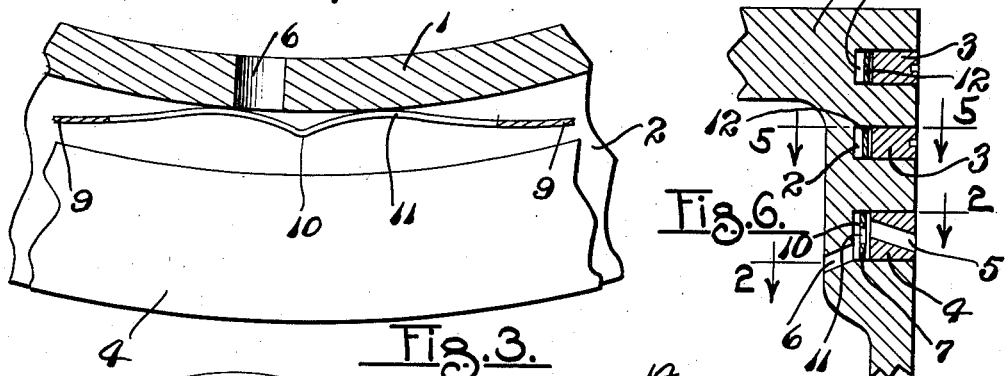
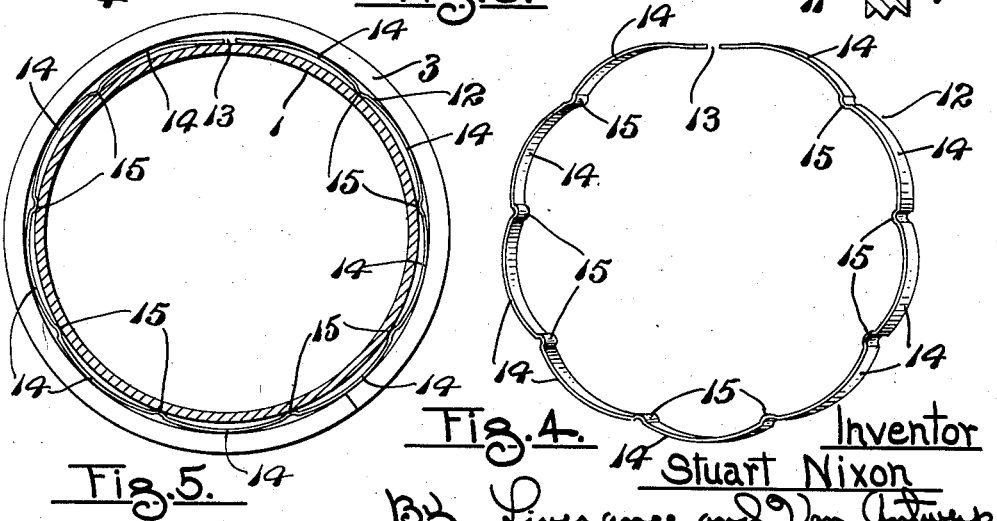
Inventor
Stuart Nixon
By Liverance and Van Antwerp
Attorneys Patented Mar. 29, 1938

2,112,425

UNITED STATES PATENT OFFICE 2,112,425

SPRING EXPANDER FOR PISTON RINGS

Stuart Nixon, Muskegon, Mich., assignor to Sealed Power Corporation, Muskegon, Mich., a corporation of Michigan Application May 17, 1937, Serial No. 143,019

5 Claims. (Cl. 309—43)

This invention relates to inner spring expanders adapted to be used with piston rings, being located at the inner curved sides thereof and between the rings and the bottoms of the piston ring grooves in which the rings are located.

This invention relates to novel constructions of spring expanders and particularly to a spring expander which may be used in conjunction with so-called oil piston rings, that is, rings which in traversing a cylinder wall scrape or otherwise collect excess oil from the walls which passes through slots in the piston rings to the bottoms of the ring grooves and therefrom is drained to the interior of the piston through suitable drainage openings.

Spring expanders when used with such oil rings likewise require slots or other openings therethrough for the passage of oil to the drainage openings. With my invention the expander is made into substantially circular form and is parted at one side. It is made from thin spring material, and formed with a plurality of spaced apart sections bent into substantially convex form at their outer sides. Between the ends of such adjacent sections the expander is preferably longitudinally slotted for oil passage, and such slotted sections are pressed outwardly into substantially V-shape whereby when the expander is placed between a piston ring and the bottom of a piston ring groove and the expander compressed as it will be when the piston ring is contracted to close its parting, there are always parts of the expander in which the oil passing slots are located spaced from the bottom of the piston ring groove. Likewise, at each end of each of the V-shaped portions there is provided a point of bearing of the expander against the bottom of the piston ring groove, said bearing points being one adjacent each end of each slot for oil passage made through the spring expander. Such type of expander ring is also of value in conjunction with the rings when not of the oil collecting type in that a more firm and better bearing of the expander at the bottom of the piston ring groove is provided because of the two points of bearing. Without such outwardly projecting V-shaped portions there would be but one point of bearing where there are now two so that the number of bearing points of the expander against the bottom of the ring groove is doubled.

It is also an object of my invention to provide an expander ring both of the form which has been specifically described and also in other forms wherein, except for relatively narrow bearing points of the expander against the bottom of the ring grooves, the main body portions of the expander will not contact with and engage said bottom of the ring groove.

The invention is fully described in the following description, taken in connection with the accompanying drawing, in which, Fig. 1 is a perspective view of a spring expander particularly adapted for use with oil rings.

Fig. 2 is a horizontal section and plan, the section being taken substantially on the plane of line 2—2 of Fig. 6, Fig. 3 is a fragmentary enlarged horizontal section showing the conformation of the expander when it is in use between a piston ring and the bottom of a ring groove in which the piston ring is located.

Fig. 4 is a perspective view of another form of expander better adapted for use with so-called compression rings.

Fig. 5 is a section and plan similar to Fig. 2 taken substantially on the plane of line 5—5 of Fig. 6, and Fig. 6 is a fragmentary vertical section through the upper part of a piston equipped with both compression and oil rings and with the spring expanders of my invention.

Like reference characters refer to like parts in the different figures of the drawing.

The piston 1 of conventional form has ring receiving grooves 2 therein in which compression rings like those shown at 3, or oil passing rings such as indicated at 4 may be located, the usual set up being for an oil ring to be located in the lowermost piston ring groove. Oil rings of this character have slots 5 cut therethrough between their upper and lower flat parallel sides of the ring, and the lowermost ring groove in which said oil ring is located has a plurality of oil drainage openings 6 leading to the interior of the piston.

The expander 7, shown in Figs. 1, 2, and 3, is made from a length of relatively thin spring steel stock shaped into approximately circular form, at its ends being separated as at 8. The approximately circular length of material used is formed at spaced apart intervals from one end of the gap or parting at 8 to the other with outwardly bowed or curved sections 9 having convex surfaces at their outer sides. The integral connecting portions between the adjacent ends of consecutive outwardly bowed sections 9 are formed with outwardly extending substantially V-shaped projections 10 so that between the adjacent ends of any two sections 9, except at the parting 8, the integral connecting portion is continued into one side of the V-shaped portion 10, meeting and integrally joining at the apex of said projection as shown. Horizontal slots 11 are cut through the expander so as to extend across each of these V-shaped parts 10 and partly into each of the sections 9.

With this construction of expander, as best shown in Fig. 3, the outermost parts of the convex sections 9 are pressed against by the inner curved side of the piston ring 4. The expander bears against the bottom of the piston ring groove at each end of the V-shaped projecting portions 10, so that the apex of a projection 10 is always spaced outwardly a short distance from the bottom of the piston ring groove. In such case, irrespective of the position of the expander in the ring groove, there will never be any time when any oil drawing opening 6 is covered by a part of the expander so as to close it, and there is always free passage for the oil through the slots 5, the slots 11 and thence to the drainage openings 6. Furthermore, at no time will the expander bear upon any extensive area against the bottom of the ring groove but will have relatively narrow contact engagements with the bottom of the ring groove and, with the form of ring shown in Fig. 1, at a relatively large number of places.

Although the various figures of the drawing show the above discussed V-shaped parts 10 as extending outwardly to a point, it is to be understood that such portions may be extended still further or be slightly rounded at the point without in any way departing from the spirit of the invention.

In Figs. 4 and 5 a different form of expander 12 is shown. It likewise consists of a length of relatively thin spring steel stock shaped into approximately circular form. This ring expander, from the ends of the parting at 13, is formed into a consecutive series of outwardly bowed sections 14 at the ends of which the metal is pressed into a short substantially semi-circular connecting portion 15. Such connecting portions 15, at their inner sides, bear against the bottom of the ring groove while the outer sides of the convexly bowed sections 14 are pressed against by the piston ring 3 and flatten out when the parting at the piston ring is closed, as it must be when it is installed within an engine cylinder. The bearing points of the parts 15 against the bottom of the ring groove are likewise of small areas and the intermediate portions 14 of the spring expander do not have any contact engagement with the bottoms of the ring grooves. This provides a very practical, simple, effective and useful expander for piston rings of the so-called compression type.

Spring ring expanders used with piston rings in internal combustion engines are desirable and useful particularly in enhancing the tension of piston rings after they have been in service in an engine for a considerable period of time. The structures described have been thoroughly tested and in actual practice have proved exceptionally useful and desirable.

The invention is defined in the appended claims and is to be considered comprehensive of all forms of structure coming within their scope.

I claim:

1. A piston ring expander comprising, a length of thin spring material slightly narrower in width than the ring groove of a piston in which it is to be used, said expander being generally of a circular form with separated ends at one side, and said expander having a plurality of outwardly curved sections substantially equally spaced around the same and with connecting sections between the ends of the outwardly curved sections, the middle portions of said connecting sections being pressed outwardly substantially in a V-form.

2. A piston ring expander having the construction defined in claim 1, each of said V-shaped projections being slotted across the same and said slots at the ends thereof extending partly into the adjacent outwardly curved sections.

3. A piston ring expander comprising, a length of thin spring material having a width slightly less than the width of a piston ring groove in which it is to be used, said expander being generally of circular form and having separated ends at one side, and also having a plurality of spaced apart longitudinal slots therein around the expander, said slotted portions of the ring being pressed outwardly in the form of a shallow V, the portions of the rings between said V-shaped portions being outwardly curved and the sides of the V-shaped portions being inwardly curved on a radius shorter than the radius of curvature of the first mentioned curved sections, as specified.

4. A piston ring expander comprising, a length of thin spring material slightly narrower in width than the width of a piston ring groove in which it is to be used, and having generally a circular form with ends at one side thereof separated from each other, said expander at spaced apart points having outwardly pressed portions shaped substantially as a shallow V and with outwardly curved sections between said V-shaped portions, the sides of the V-shaped portions continuing in inwardly curved portions which contact and merge with the ends of said outwardly curved portions, whereby at each end of each V-shaped portion two spaced apart points of the contact of the expander are provided to engage against the bottom of a ring groove when the expander is located therein.

5. A piston ring expander having a construction as defined in claim 4, the radius of curvature of said outwardly curved portions being greater than the radius of curvature of the inwardly curved portions of the expander.

STUART NIXON.